United States Patent [19]
Hoelle et al.

[11] Patent Number: 5,370,427
[45] Date of Patent: Dec. 6, 1994

[54] EXPANSION JOINT FOR FLUID PIPING WITH ROTATION PREVENTION MEMBER

[75] Inventors: James S. Hoelle; Ivan H. Peterson, both of Hamilton, Ohio; Thomas G. Wakeman, Lawrenceburg, Ind.; Michael R. Storage, Beavercreek, Ohio; Michael A. Umney, Mason, Ohio; Mark K. Meyer, Centerville, Ohio

[73] Assignee: General Electric Company, Cincinnati, Ohio

[21] Appl. No.: 179,286

[22] Filed: Jan. 10, 1994

[51] Int. Cl.⁵ ............................................. F16L 27/12
[52] U.S. Cl. ................................. 285/301; 285/226
[58] Field of Search ............... 285/299, 300, 301, 226, 285/227, 228

[56] References Cited

U.S. PATENT DOCUMENTS

| | | | |
|---|---|---|---|
| 337,037 | 3/1886 | White | 285/301 X |
| 2,479,104 | 8/1949 | Dreyer | 285/228 |
| 2,840,394 | 6/1958 | Rohr | 285/300 |
| 2,904,356 | 9/1959 | Love | 285/226 |
| 2,911,238 | 11/1959 | Myers et al. | 285/300 |
| 2,958,550 | 11/1960 | McDonald | 285/301 |
| 3,133,754 | 5/1964 | Peters | 285/301 |
| 3,692,337 | 9/1972 | Mischel | 285/299 |
| 4,350,372 | 9/1982 | Logsdon | 285/226 X |
| 4,645,244 | 2/1987 | Curtis | 285/301 |
| 5,145,215 | 9/1992 | Udell | 285/226 X |

FOREIGN PATENT DOCUMENTS

| | | | |
|---|---|---|---|
| 108829 | 5/1984 | European Pat. Off. | 285/227 |
| 1244446 | 9/1960 | France | 285/227 |
| 1401419 | 4/1965 | France | 285/228 |
| 695015 | 8/1953 | United Kingdom | 285/301 |
| 988639 | 4/1965 | United Kingdom | 285/228 |
| 238971 | 3/1969 | U.S.S.R. | 285/301 |

Primary Examiner—Eric K. Nicholson
Attorney, Agent, or Firm—Jerome C. Squillaro; Bernard E. Shay

[57] ABSTRACT

An expansion joint for connecting first and second fluid-carrying pipes comprising first and second annular couplings which are operably affixable to respective ones of the pipes. In a preferred embodiment the couplings include cylindrical bores of substantially the same diameter disposed relative to one another to form a passage for providing flow communication between the pipes. An annular bellows extends between the couplings for accommodating relative axial movement and angular misalignment between the pipes and is disposed radially outward of the passage to capture any fluid leaking between the interfacing surfaces of the couplings. A second cylindrical bore of a first one of the couplings engages an outer spherical surface of the second coupling to allow the second coupling to pivot in a manner which accommodates angular misalignment between the pipes. Means are provided for limiting the pivoting of the second coupling and for preventing the first coupling from rotating about a centerline of the joint, thereby avoiding unacceptable bending and torsional loading of the bellows. The expansion joint further includes means for limiting the axial compression and axial extension of the bellows.

5 Claims, 2 Drawing Sheets

EXPANSION JOINT FOR FLUID PIPING WITH ROTATION PREVENTION MEMBER

BACKGROUND OF THE INVENTION

1. Field of the Invention

The present invention relates generally to gas turbine engines and, more particularly, to an expansion joint for use in connecting fluid piping of gas turbine engines.

2. Related Art

Gas turbine engines such as those used for aircraft propulsion necessarily include external piping systems for delivering fluids, either gases or liquids, from one engine component to another or for connecting an engine component with an aircraft system. These piping systems may necessarily be relatively long in length. An example of such a piping system is that which supplies cooling or heating air, depending upon engine condition, from a compressor stage of the core engine to a turbine component. External piping systems are typically fixedly mounted at opposite ends to stationary engine structures and, depending on engine condition, may be either hotter or cooler than adjacent engine structures. Consequently, piping systems may experience a differential thermal growth relative to that of the engine between points of attachment of the piping system. Accordingly, such piping systems typically include at least one expansion joint connecting adjacent fluid-carrying pipes to accommodate differential thermal expansion or contraction of the fluid-carrying pipes relative to the corresponding engine structure to which the pipes are attached.

One prior expansion joint is the piston seal type joint wherein an outer surface of a first fluid-carrying pipe slidingly engages an internal surface of an adjacent fluid-carrying pipe. Piston seal joints may accommodate expansion or contraction of one pipe relative to the other in a direction parallel to the longitudinal centerline of the joint and may further accommodate rotation of one pipe relative to the other about the joint centerline. However, piston seal joints are not tolerant of lateral misalignment which occurs when the centerlines of the mating pipes are generally parallel but laterally displaced relative to one another. Additionally, if the outer surface of the first pipe and the internal surface of the second pipe are cylindrical, the piston seal joint is also not tolerant of angular misalignment which occurs when the centerlines of the pipes are angled relative to one another. Furthermore, piston seal joints are subject to leakage due to a required clearance between the mating surfaces, manufacturing tolerances resulting in a larger than required clearance between the mating surfaces, and vibration induced wear on the mating surfaces. Although such joints may utilize wear coatings on the mating surfaces and/or vibration damping means to minimize leakage between the mating surfaces, this leakage may not be entirely eliminated. Accordingly, piston seal joints may not be suitable for use in piping systems transporting liquids such as fuel and oil where leaks may not be tolerated, unless other measures are employed to contain the leaks. When used in piping systems transporting gases, piston joint leaks may result in an engine performance penalty.

Another prior expansion joint is the bellows joint wherein an annular bellows extends between adjacent fluid-carrying pipes. The bellows joint is considered to be a zero leak joint and can accommodate relative expansion and contraction between the adjacent pipes. In order to avoid flow-induced high cycle fatigue failure in the bellows, the bellows joint typically includes a flow liner to shield the bellows undulations from the fluid flowpath. An example of such a bellows-type expansion joint is that which is disclosed in U.S. Pat. No. 5,145,215 to Udell, issued Sep. 8, 1992. As shown in FIGS. 1-5 the Udell joint does not include a constant diameter flow passage but instead has an inner sleeve 17 inserted within a larger outer sleeve 16. The cylindrical portion of sleeve 17 which mates with sleeve 16 is shown to be reduced in diameter relative to the enlarged inlet portion 18 of sleeve 17. The configuration of sleeve 17 causes a fluid system pressure drop relative to a joint having a flow passage with a constant flow area equal to that existing in enlarged inlet portion 18. Additionally, bellows-type expansion joints such as that disclosed in Udell are flow-direction sensitive. If the expansion joint is installed in the wrong direction fluid flow may be forced into the annular space between sleeve members, such as through gaps 29a, 29b, 30a and 30b illustrated in FIG. 2a of Udell, which in turn may cause excessive pressure drop and may lead to bellows damage. The Udell apparatus is configured to allow the smaller inner sleeve 17 to be cocked relative to the larger outer sleeve 16 as shown in FIG. 5 to absorb bending forces encountered in normal use. A limited cocking of sleeve members relative to one another, to accommodate bending forces incurred during use as described in Udell, or to accommodate angular misalignment at assembly between mating fluid pipes to which the expansion joint is connected, is desirable. However, bellows-type expansion joints of the general type having a smaller flow liner inserted into a larger mating coupling, wherein the flow liner and mating coupling may be angularly misaligned relative to one another, have been known to be subject to excessive misalignment causing high bending stresses in localized areas of the bellows.

Other problems which have been encountered with prior bellows-type expansion joints is bellows damage, particularly during assembly, due to excessive compression of the bellows and bellows distress caused by torsional loading of the bellows.

In view of the foregoing, prior to the present invention a need existed for an improved expansion joint for use in fluid piping systems to resolve the aforementioned problems associated with prior expansion joints.

SUMMARY OF THE INVENTION

The present invention is directed to an expansion joint for use in connecting first and second fluid-carrying pipes. According to a preferred embodiment of the present invention, the expansion joint comprises a first annular coupling having a first cylindrical bore and a first end operably affixable to the first fluid-carrying pipe. The expansion joint further comprises a second annular coupling having a cylindrical bore and a first end operably affixable to the second fluid-carrying pipe. A passage extends through the first and second couplings for providing flow communication between the first and second fluid-carrying pipes. An annular bellows extends axially between the first and second couplings for accommodating axial movement of the first and second fluid-carrying pipes relative to one another. The annular bellows has opposite ends fixedly connected to the first and second couplings, respectively. The bellows is disposed radially outward of the passage so as to form a primary sealing means for capturing any fluid leaking between the first and second couplings from the passage. The first coupling has a second cylindrical bore formed in a second end thereof and the second coupling includes an enlarged second end having a spherical outer surface. The spherical outer surface engages the second cylindrical bore so as to allow the second coupling to pivot about a geometric center of the enlarged second end of the second coupling and so as to allow the second coupling to slide axially relative to the first coupling. Accordingly, the spherical outer surface of the second coupling and the second cylindrical bore of the first coupling combine to accommodate angular misalignment between the first and second fluid-carrying pipes and to accommodate axial movement of the first and second fluid-carrying pipes relative to one another. The spherical outer surface and the second cylindrical bore also combine to form a secondary sealing means of the expansion joint.

Another preferred embodiment in accordance with the present invention includes the following additional structural features and functions. The expansion joint further comprises a radially outwardly extending annular flange attached to the second coupling and an annular shield disposed coaxially with and fixedly attached to the first coupling and radially outward of the annular bellows. The flange is radially inward of and radially spaced from the shield so as to limit the pivoting of the second coupling about the geometric center of the enlarged second end of the second coupling. The first coupling includes an axially facing shoulder formed between the first and second cylindrical bores. The shoulder is disposed relative to the second end of the second coupling so as to limit the axial compression of the bellows. The annular shield includes a distal end comprising a radially inwardly extending flange which is disposed relative to the radially outwardly extending flange attached to the second coupling so as to limit axial extension of the bellows. The first cylindrical bore of the first coupling has a diameter which is substantially equal to a diameter of the cylindrical bore of the second coupling, thereby minimizing pressure drop of the fluid flowing through the passage. The expansion joint further comprises a means for preventing rotation of the second coupling relative to the first coupling about a longitudinally extending centerline of the expansion joint. The preventing means comprises at least one pin protruding radially outwardly from the outer spherical surface of the enlarged second end of the second coupling and at least one axially extending groove formed in the second end of the first coupling, with the groove receiving the pin.

BRIEF DESCRIPTION OF THE DRAWINGS

The structural features and functions of the present invention, as well as the advantages derived therefrom, will become apparent from the subsequent detailed description of the preferred embodiments when taken in conjunction with the accompanying drawings in which.

DETAILED DESCRIPTION

Figure 1:
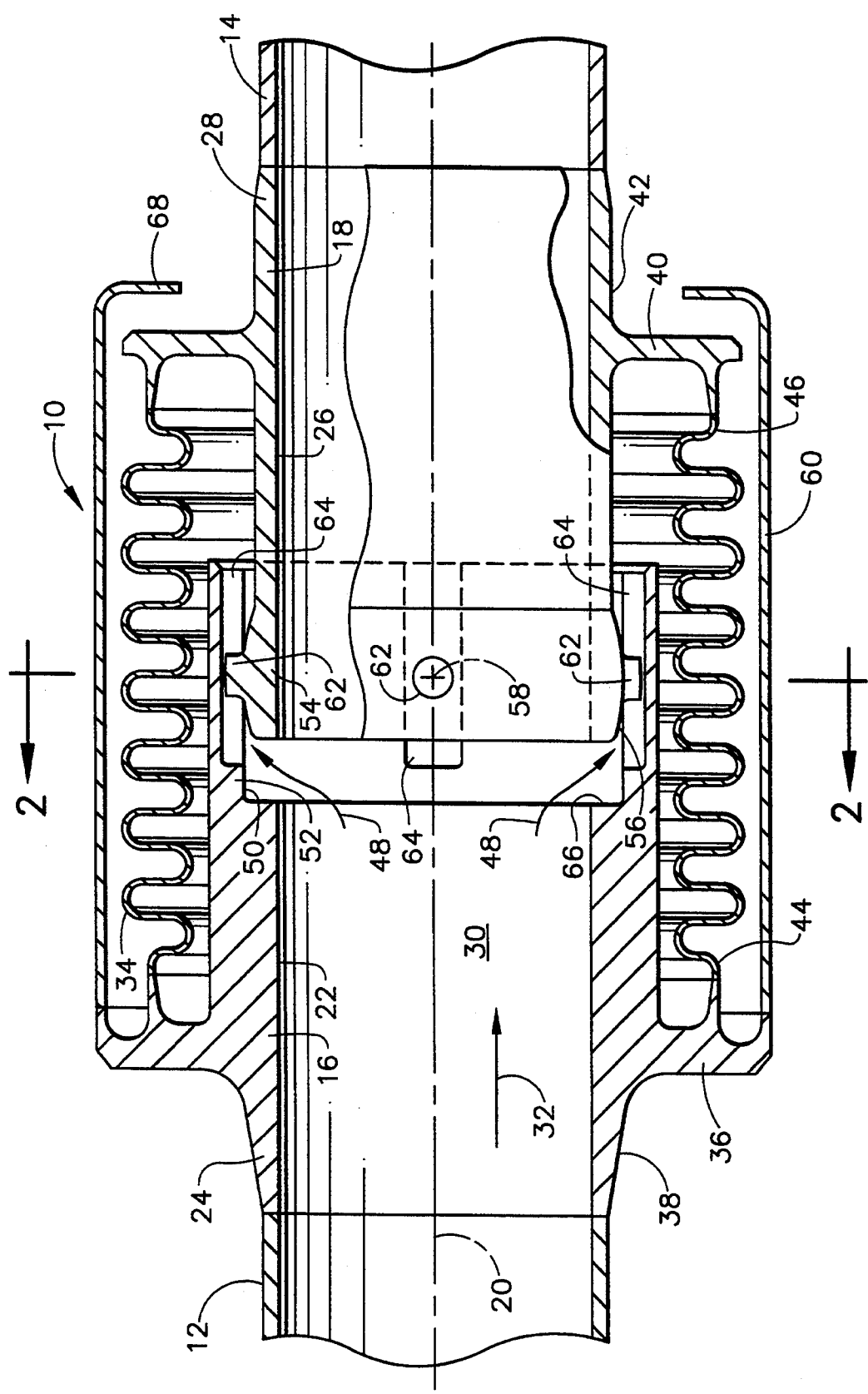
FIG. 1 is a longitudinal cross-section, partly in cutaway view, illustrating a preferred embodiment of the expansion joint of the present invention.

Referring now to the drawings, wherein like reference numerals have been used for similar elements throughout, FIG. 1 illustrates a longitudinal cross-section, partly in cutaway view, of the expansion joint 10 of the present invention. Expansion joint 10 is used to fluidly connect first and second fluid-carrying pipes 12 and 14, respectively. In a preferred embodiment pipes 12 and 14 are part of an external piping system of a gas turbine engine (not shown) and pipes 12 and 14 may be used to transport either liquids or gases. However, it should be understood that expansion joint 10 may be used to fluidly connect pipes which are used in systems other than those utilized by gas turbine engines.

Expansion joint 10 comprises a first annular coupling 16 and a second annular coupling 18 which are each disposed about an axially, longitudinally extending centerline 20 of joint 10. First coupling 16 has a first cylindrical bore 22 and a first end 24 which is operably affixable to the first fluid-carrying pipe 12. Second coupling 18 includes cylindrical bore 26 and a first end 28 which is operably affixable to the second fluid-carrying pipe 14. In a preferred embodiment, ends 24 and 28 are butt-welded to pipes 12 and 14, respectively. The first cylindrical bore 22 of first coupling 16 is disposed relative to the cylindrical bore 26 of second coupling 18 so as to define a passage 30 extending through the first and second couplings 16 and 18, respectively, for providing flow communication between first and second fluid-carrying pipes 12 and 14, respectively. As illustrated in FIG. 1, fluid flow 32 flows from first pipe 12 through passage 30 to second pipe 14. However, it should be understood that the expansion joint 10 is also suitable for accommodating fluid flowing from second pipe 14 to first pipe 12 since the expansion joint 10 of the present invention is not flow-direction sensitive for reasons which are discussed subsequently.

Expansion joint 10 further comprises an annular flexible bellows 34 of conventional design which comprises a plurality of annular and axially spaced bellows corrugations which are interconnected as shown in FIG. 1. Bellows 34 extends axially between first coupling 16 and second coupling 18 for accommodating axial movement of first and second pipes 12 and 14, respectively, relative to one another. First coupling 16 includes a radially outwardly extending flange 36 protruding radially outwardly from a radially outer surface 38 of first coupling 16. Joint 10 further includes a radially outwardly extending flange 40 attached to and protruding radially outwardly from a radially outer and generally cylindrical surface 42 of second coupling 18. Flange 40 may be integrally formed with second coupling 18 or may be separately manufactured and attached to coupling 18 by conventional means. Bellows 34 includes first and second ends 44 and 46, respectively, which are illustrated in FIG. 1 to be in abutting relationship with axially extending lips of flanges 36 and 40, respectively. However, bellows 34 and flanges 36 and 40 may be configured in a preferred embodiment to accommodate attachment of bellows 34 to flanges 36 and 40 by resistance welding to facilitate manufacture of joint 10. In a preferred embodiment bellows 34, first coupling 16 and second coupling 18 are each manufactured of Inconel 625 which is suitable for use in various piping systems of gas turbine engines. However, it should be understood that other materials may be selected, depending upon application, to manufacture bellows 34 and couplings 16 and 18. Bellows 34 is disposed radially outward of passage 30 so as to form a primary sealing means for capturing any fluid which may leak between the rotating surfaces of coupling 16 and 18 as indicated by fluid flow arrow 48.

First coupling 16 further includes a second cylindrical bore 50 formed in a second end 52 of coupling 16 and second coupling 18 further includes an enlarged second end 54 which comprises a partial sphere having a spherical outer surface 56. Spherical outer surface 56 is defined by a radius originating from the geometric center 58 of the enlarged second end 54 of the second coupling 18. Spherical outer surface 56 engages second cylindrical bore 50 so as to allow second coupling 18 to pivot about the geometric center 58 of second end 54 of second coupling 18 and so as to allow the second coupling 18 to slide axially relative to the first coupling 16. Bellows 34 accommodates axial movement of pipes 12 and 14 relative to one another in a conventional manner, with bellows 34 being either compressed or extended. Bellows 34 accommodates the pivoting action of second coupling 18 by flexing, with a first circumferentially extending portion of bellows 34 being compressed and a second circumferentially extending portion of bellows 34 being extended. Consequently, spherical outer surface 56 and second cylindrical bore 50 combine with bellows 34 to accommodate angular misalignment between first and second fluid-carrying pipes 12 and 14, respectively, and to accommodate axial movement of pipes 12 and 14 relative to one another. This angular misalignment accommodation is achieved by pivoting second coupling 18 about geometric center 58 to the proper orientation, and flexing bellows 34 accordingly, to accommodate angular misalignment between pipes 12 and 14. It should be understood that the phrase "angular misalignment," as applied to pipes 12 and 14, applies to a condition where the individual centerlines of pipes 12 and 14 are angled relative to one another and does not refer to the relative angular, or clocked, positions of pipes 12 and 14 about their respective centerlines. It should be further understood that expansion joint 10 does not accommodate lateral offset, or offset misalignment between pipes 12 and 14 when the individual centerlines of pipes 12 and 14 are generally parallel to one another and laterally displaced relative to one another. Spherical outer surface 56 and second cylindrical bore 50 also combine to form a secondary sealing means for inhibiting fluid from leaking from passage 30. However, since a small clearance must be provided between spherical outer surface 56 and second cylindrical bore 50 for assembly purposes, a relatively small amount of fluid may leak between surface 56 and bore 50 as indicated by fluid flow arrow 48.

Expansion joint 10 further comprises an annular shield 60 which is disposed coaxially with first coupling 16 and which is fixedly attached to radially outwardly extending flange 36. In a preferred embodiment shield 60 is butt-welded to flange 36. Annular shield 60 is disposed radially outward of annular bellows 34 and therefore inhibits any debris which is exterior to joint 10 from entering the corrugations of bellows 34, wherein such debris could adversely affect the function of bellows 34. Radially outwardly extending flange 40, which is attached to second coupling 18, is radially inward of and radially spaced from annular shield 60 so as to limit the pivoting of second coupling 18 about the geometric center 58 of enlarged second end 54 of second coupling 18. Flange 40 is radially spaced from shield 60 by a predetermined distance which causes flange 40 to contact shield 60 after second coupling 18 has pivoted through a predetermined misalignment arc (not shown) which is selected to avoid unacceptable bending distortion, and the associated bending stresses, of bellows means 34. The orientation of first coupling 16, second coupling 18, and centerline 20 of expansion joint 10 which are illustrated in FIG. 1 correspond to generally aligned locations of pipes 12 and 14 relative to one another. It should be understood that when pipes 12 and 14 are angularly misaligned relative to one another the centerline 20 of expansion joint 10 is discontinuous and the centerline of second coupling 18 is angled relative to the centerline of first coupling 16. The predetermined misalignment arc (not shown), which is approximately five degrees in a preferred embodiment but which can be varied based on application requirements, is defined as the acute angle between the centerlines of couplings 16 and 18 when flange 40 contacts shield 60. The radial spacing between flange 40 and shield 60 is less than the radial spacing between second cylindrical bore 50 of first coupling 16 and the radially outer and generally cylindrical surface 42 of second coupling 18 by an amount which ensures that first coupling 16 may not contact surface 42 as second coupling 18 pivots about geometric center 58, for any axial position of second coupling 18 relative to first coupling 16, thereby avoiding potential damage to surface 42. The ability of expansion joint 10 to accommodate a predetermined amount of angular misalignment between pipes 12 and 14 while avoiding undesirable distress to bellows means 34 is a central feature of the present invention.

The diameter of the first cylindrical bore 22 of first coupling 16 is substantially equal to the diameter of the cylindrical bore 26 of second coupling 18 thereby minimizing the pressure drop of fluid flow 32 flowing through passage 30. This minimization of pressure drop of fluid flow 32 is accomplished since the pressure drop associated with the reduced diameter internal flow sleeves of prior bellows joints is avoided and since bores 22 and 26 provide smooth boundaries of passage 30. The diameters of bores 22 and 26 are nominally equal to one another and may differ slightly from one another due to manufacturing tolerance variations. The substantially equal size of bores 22 and 26 combined with the engagement of spherical outer surface 56 of second coupling 18 with the second cylindrical bore 50 of the first coupling 16 allows expansion joint 10 to be installed without regard to the direction of fluid flow 32, i.e., expansion joint 10 is not flow-direction sensitive.

Figure 2:
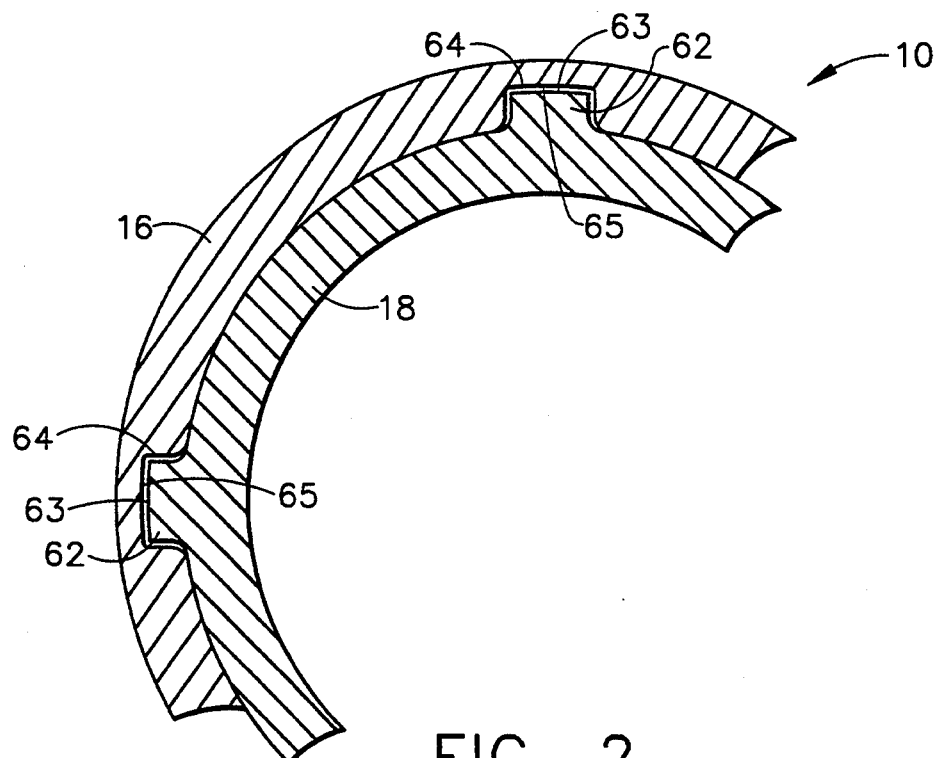
FIG. 2 is a view taken along line 2—2 in FIG. 1, with the bellows and annular shield omitted for clarity, illustrating an anti-rotation means of the present invention.

Expansion joint 10 further comprises a means for preventing rotation of second coupling 18 relative to first coupling 16 about the longitudinally extending centerline 20 of expansion joint 10. The preventing means comprises at least one pin 62 protruding radially outwardly from outer spherical surface 56 of enlarged second end 54 of second coupling 18. In a preferred embodiment the preventing means comprises a pair of circumferentially spaced, diametrically opposed pins 62. However, it is also envisioned to be within the scope of the present invention to utilize a plurality of pins 62, of a quantity greater than two, such as four for example, wherein the pins are equally spaced circumferentially, and furthermore a single pin 62 may be advantageously utilized in certain applications. The number of pins 62 for a given application may be selected based on potential torsional loads which may be imposed on first and second couplings 16 and 18, respectively. In a preferred embodiment pins 62 and second coupling 18 comprise a one-piece construction with cylindrical pins 62 and spherical outer surface 54 being formed by machining. The preventing means further comprises at least one axially extending groove 64 formed in the second end 52 of first coupling 16. As with pins 62, in a preferred embodiment the preventing means comprises a pair of circumferentially spaced, diametrically opposed grooves 64. In any application the number, or quantity, of grooves 64 is equal to the number, or quantity, of pins 62, with each of the grooves 64 receiving one of the cylindrical pins 62. Pins 62 and grooves 64 combine to prevent second coupling 18 from rotating relative to first coupling 16 about centerline 20 and therefore inhibit torsional loading of bellows 34. This enhances the service life of bellows 34 since conventional bellows are typically sensitive to torsional loading. The inclusion of grooves 64 in second end 52 of first coupling 16 and the one-piece construction of pins 62 and second coupling 18 affords a means for inhibiting torsional loading of bellows 34 in a weight efficient manner. As best seen in FIG. 2, where bellows 34 and shield 60 have been omitted for clarity, the radially outer surface 63 of each pin 62 is spaced apart from surface 65 of a corresponding one of grooves 64 by a predetermined radial clearance which is consistent with the predetermined misalignment arc (not shown). Consequently, based on the cylindrical nature of pins 62 and the radial clearance between surfaces 63 and 65, pins 62 do not inhibit the pivoting of second coupling 18.

Expansion joint 10 further includes both a means for limiting axial compression of bellows 34 and a means for limiting axial expansion of bellows 34 as follows. First coupling 16 includes an axially facing shoulder 66 which is formed between first cylindrical bore 22 and second cylindrical bore 50 of first coupling 16. Shoulder 66 is disposed relative to second end 54 of second coupling 18 so as to limit axial compression of bellows means 34. Annular shield 60 includes a distal end comprising a radially inwardly extending flange 68 which is disposed relative to the radially outwardly extending flange 40 attached to second coupling 18 so as to limit axial extension of the bellows 34.

In a preferred embodiment expansion joint 10 is assembled as follows. Bellows 34 is slid over the second end 52 of first coupling 16, spherical outer surface 56 of second coupling 18 is inserted into second cylindrical bore 50 of first coupling 16, and bellows 34 is then attached to flanges 36 and 40. If joint 10 is configured to allow bellows 34 to be attached by resistance welding it may be necessary to engage couplings 16 and 18 with one another prior to sliding bellows 34 over couplings 16 and 18. In either case, annular shield 60 is then slid over couplings 18 and 16 and bellows 34 and butt-welded to flange 36. At this point expansion joint 10 is complete and first end 24 of first coupling 16 is operably affixable to pipe 12, as by butt-welding, and first end 28 of second coupling 18 is operably affixable to pipe 14, as by butt-welding. In an alternate embodiment (not shown) expansion joint 10 may be configured to allow bellows 34 to be attached to first coupling 16 and second coupling 18 by brazing. This may be achieved by increasing the width of flange 36 to allow the first end 44 of bellows 34 to be sandwiched between and brazed to flange 36 and shield 60 and by forming a separate L-shaped flange in place of flange 40 which would allow the second end 46 of bellows 34 to be sandwiched between and brazed to the L-shaped flange and the radially outer and generally cylindrical surface 42 of coupling 18.

Figure 3:
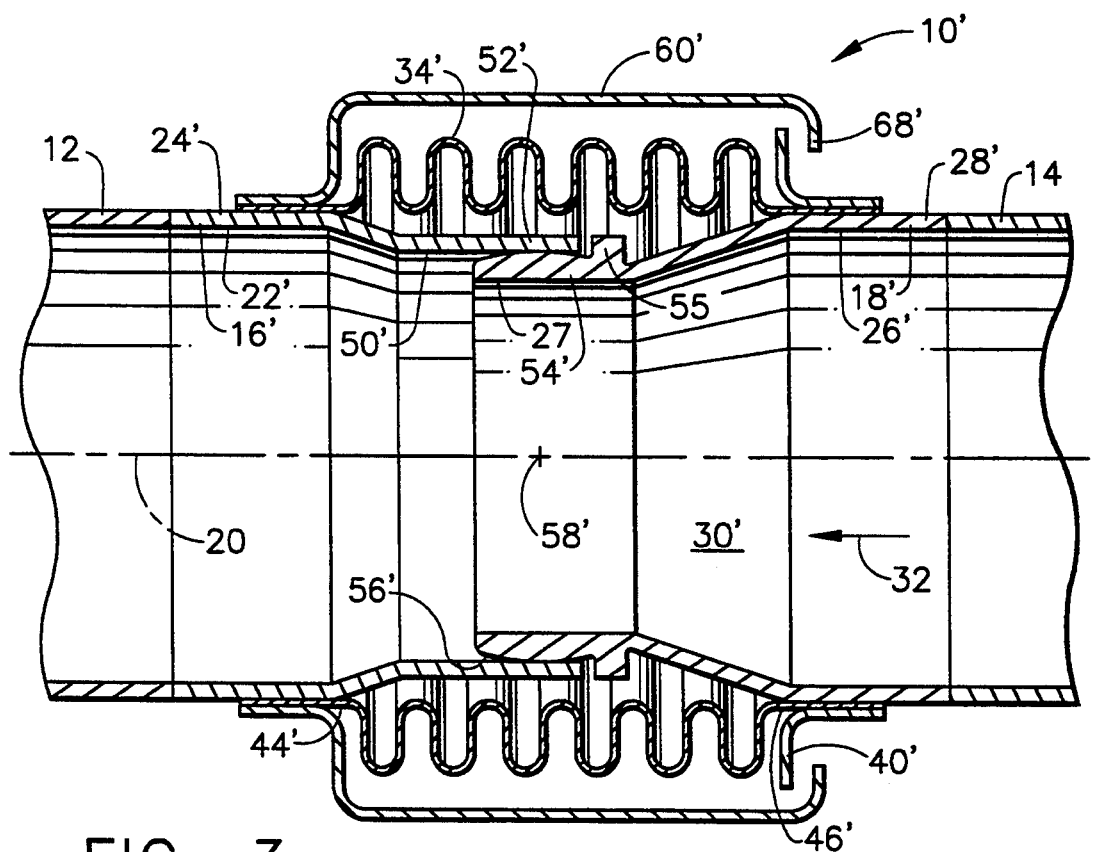
FIG. 3 is a longitudinal cross-section similar to FIG. 1 illustrating a simplified embodiment of the present invention.

FIG. 3 illustrates expansion joint 10' which represents a simplified embodiment of the present invention. As with expansion joint 10, joint 10' comprises a first coupling 16' and a second coupling 18' which have first ends 24' and 28', respectively, which are operably affixable to pipes 12 and 14, respectively. First coupling 16' includes first and second cylindrical bores 22' and 50' but differs from first coupling 16 since bore 50' is disposed radially inward of bore 22' and since both of bores 22' and 50' form a portion of passage 30'. Unlike second coupling 18, second coupling 18' includes first and second cylindrical bores 26' and 27 with bore 27 being disposed radially inward of bore 26'. Bores 22' and 50' of coupling 16' combine with bores 27 and 26' of coupling 18' to define passage 30' which extends through couplings 16' and 18'. Accordingly, it can be seen that passage 30' does not constitute a constant diameter flow passage, with the reduced diameters of bores 27 and 50', relative to bores 26' and 22', respectively, being employed for ease of manufacture and utilized in applications which are tolerant of the resultant increase in pressure drop through passage 30'.

Like bellows 34, bellows 34' extends axially between, and has opposite ends 44' and 46' fixedly connected to, first and second couplings 16' and 18' respectively. Bellows 34', annular shield 60' and flange 40' function the same as the corresponding elements of joint 10 which are illustrated in FIG. 1. However, bellows 34', shield 60' and flange 40' are shown to be configured to permit end 44' of bellows 34' and shield 60' to be resistance welded to first coupling 16' and to permit end 46' of bellows 34' and flange 40' to be resistance welded to second coupling 18'.

Second coupling 18' includes enlarged second end 54' having a spherical outer surface 56' which engages second cylindrical bore 50' of first coupling 16' in the same manner as the corresponding elements of joint 10. Consequently, second coupling 18' may slide axially relative to first coupling 16' and may pivot about the geometric center 58' of enlarged second end 54' to accommodate axial movement of pipes 12 and 14 relative to one another and to accommodate angular misalignment between pipes 12 and 14. Spherical outer surface 56' and second cylindrical bore 50' also form a secondary sealing means of expansion joint 10'. Notwithstanding the presence of the seal between surface 56' and bore 50', the preferred assembly orientation of joint 10' is such that flow 32 travels from pipe 14 to pipe 12, as illustrated in FIG. 3, to avoid unnecessary additional pressure drop and leakage between surface 56' and bore 50' with flow in the opposite direction.

Flange 40', which is attached to second coupling 18', and shield 60' function in same manner as the corresponding elements of joint 10 to limit the pivoting of second coupling 18' about geometric center 58' of enlarged second end 54' of coupling 18' thereby avoiding bellows distress which could result from excessive pivoting of second coupling 18'. As with shield 60, shield 60' includes a distal end comprising a radially inwardly extending flange 68' which is disposed related to flange 40' to limit axial extension of bellows 34'.

The means for preventing axial compression of bellows 34' is different structurally than that of joint 10, but the same results may be achieved. Second coupling 18' includes an annular shoulder portion 55 which is disposed proximate the enlarged second end 54' of second coupling 18'. Shoulder portion 55 is disposed relative to second end 52' of first coupling 16' to limit axial compression of bellows 34'. Another difference between the simplified expansion joint 10' and expansion joint 10 is that joint 10' does not include a means for preventing rotation of second coupling 18' relative to first coupling 16' about axis 20, i.e., joint 10' does not include pins 62 and grooves 64 or the equivalent thereof. The absence of pins 62 and grooves 64 reduces the complexity, and consequently the cost, of joint 10' relative to joint 10. Accordingly, the anticipated use of joint 10' is with piping systems where the expected torsional load input to couplings 16' and 18' is non-existent or relatively low, due to system piping configurations and other considerations, such that bellows distress should not occur notwithstanding the absence of an anti-rotation feature.

In conclusion, the expansion joints 10 and 10' of the present invention include the following advantageous structural features and functions. Joints 10 and 10' each include first and second annular couplings which are operably affixable to the first and second fluid-carrying pipes 12 and 14, respectively. Each joint further includes an annular bellows which extends between the first and second couplings. The bellows and the engagement of the spherical outer surface of the second coupling with the second cylindrical bore of the first coupling combine to allow joints 10 and 10' to accommodate angular misalignment between pipes 12 and 14 and axial movement of pipes 12 and 14 relative to one another. Joints 10 and 10' each further include means for: limiting the pivoting of the second coupling; limiting axial extension and axial compression of the bellows; and inhibiting debris from entering the bellows corrugations. Expansion joint 10 also includes means for preventing the second coupling from rotating relative to the first coupling about the joint centerline so as to inhibit torsional loading of the bellows. Additionally, the first cylindrical bore 22 of first coupling 16 of expansion joint 10 has a diameter which is substantially equal to the diameter of the cylindrical bore 26 of second coupling 18 thereby minimizing the pressure drop of fluid flow 32 through passage means 30 of expansion joint 10.

While the foregoing description has set forth the preferred embodiments of the invention in particular detail, it must be understood that numerous modifications, substitutions and changes can be undertaken without departing from the true spirit and scope of the present invention as defined by the ensuing claims. The protection desired to be secured by Letters Patent of the United States for this invention is defined by the subject matter of the following claims.

What is claimed is:

1. An expansion joint for use in connecting first and second fluid-carrying pipes, said expansion joint comprising:
   a) A first annular coupling having a first cylindrical bore and a first end operably affixable to said first fluid-carrying pipe;
   b) a second annular coupling having a cylindrical bore and a first end operably affixable to said second fluid-carrying pipe;
   c) a passage extending through said first and second couplings for providing flow communication between said first and second fluid-carrying pipes;
   d) an annular bellows extending axially between said first and second couplings for accommodating axial movement of said first and second fluid-carrying pipes relative to one another, said annular bellows having opposite ends fixedly connected to said first and second couplings, respectively, and wherein said annular bellows is disposed radially outward of said passage so as to form a primary sealing means for capturing any fluid leaking between said first and second couplings from said passage;
   e) said first coupling having a second cylindrical bore formed in a second end thereof;
   f) said second coupling including an enlarged second end having a spherical outer surface;
   g) said spherical outer surface engaging said second cylindrical bore so as to allow said second coupling to pivot about a geometric center of said enlarged second end of said second coupling and so as to allow said second coupling to slide axially relative to said first coupling, wherein said spherical outer surface and said second cylindrical bore combine with said bellows means to accommodate angular misalignment between said first and second fluid-carrying pipes and to accommodate axial movement of said first and second fluid carrying pipes relative to one another, said spherical outer surface and said second cylindrical bore also combining with one another to form a secondary sealing means of said expansion joint;
   h) a radially outwardly extending annular flange attached to said second coupling;
   i) an annular shield disposed coaxially with and fixedly attached to said first coupling, said shield being disposed radially outward of said annular bellows;
   j) wherein said radially outwardly extending flange is radially inward of and radially spaced from said shield so as to limit the pivoting of said second coupling about said geometric center of said enlarged second end;
   k) a means for preventing rotation of said second coupling relative to said first coupling about a longitudinally extending centerline of said expansion joint;
   l) said preventing means comprising at least one pin protruding radially outwardly from said outer spherical surface of said second end of said second coupling and at least one axially extending groove formed in said second end of said first coupling, said groove receiving said pin.

2. An expansion joint for use in connecting first and second fluid-carrying pipes, said expansion joint comprising:
   a) A first annular coupling having a first cylindrical bore and a first end operably affixable to said first fluid-carrying pipe;
   b) a second annular coupling having a cylindrical bore and a first end operably affixable to said second fluid-carrying pipe;
   c) a passage extending through said first and second couplings for providing flow communication between said first and second fluid-carrying pipes;
   d) an annular bellows extending axially between said first and second couplings for accommodating axial movement of said first and second fluid-carrying pipes relative to one another, said annular bellows having opposite ends fixedly connected to said first and second couplings, respectively, and wherein said annular bellows is disposed radially outward of said passage so as to form a primary sealing means for capturing any fluid leaking between said first and second couplings from said passage;

e) said first coupling having a second cylindrical bore formed in a second end thereof;

f) said second coupling including an enlarged second end having a spherical outer surface;

g) said spherical outer surface engaging said second cylindrical bore so as to allow said second coupling to pivot about a geometric center of said enlarged second end of said second coupling and so as to allow said second coupling to slide axially relative to said first coupling, wherein said spherical outer surface and said second cylindrical bore combine with said bellows means to accommodate angular misalignment between said first and second fluid-carrying pipes and to accommodate axial movement of said first and second fluid carrying pipes relative to one another, said spherical outer surface and said second cylindrical bore also combining with one another to form a secondary sealing means of said expansion joint;

h) a radially outwardly extending annular flange attached to said second coupling;

i) an annular shield disposed coaxially with and fixedly attached to said first coupling, said shield being disposed radially outward of said annular bellows;

j) wherein said radially outwardly extending flange is radially inward of and radially spaced from said shield so as to limit the pivoting of said second coupling about said geometric center of said enlarged second end;

k) said first coupling includes an axially facing shoulder formed between said first and second cylindrical bores;

l) said shoulder is disposed relative to said second end of said second coupling so as to limit axial compression of said bellows;

m) said annular shield includes a distal end comprising a radially inwardly extending flange;

n) said radially inwardly extending flange of said shield is disposed relative to said radially outwardly extending flange attached to said second coupling so as to limit axial extension of said bellows.

3. An expansion joint as recited in claim 2, wherein a diameter of said first cylindrical bore of said first coupling is substantially equal to a diameter of said cylindrical bore of said second coupling thereby minimizing the pressure drop of the fluid flowing through said passage.

4. An expansion joint as recited in claim 2 wherein:

a) said expansion joint further comprises a means for preventing rotation of said second coupling relative to said first coupling about a longitudinally extending centerline of said expansion joint;

b) said preventing means comprising at least one pin protruding radially outwardly from said outer spherical surface of said second end of said second coupling and at least one axially extending groove formed in said second end of said first coupling, said groove receiving said pin.

5. An expansion joint for use in connecting first and second fluid-carrying pipes, said expansion joint comprising:

a) A first annular coupling having a first cylindrical bore and a first end operably affixable to said first fluid-carrying pipe;

b) a second annular coupling having a cylindrical bore and a first end operably affixable to said second fluid-carrying pipe;

c) a passage extending through said first and second couplings for providing flow communication between said first and second fluid-carrying pipes;

d) an annular bellows extending axially between said first and second couplings for accommodating axial movement of said first and second fluid-carrying pipes relative to one another, said annular bellows having opposite ends fixedly connected to said first and second couplings, respectively, and wherein said annular bellows is disposed radially outward of said passage so as to form a primary sealing means for capturing any fluid leaking between said first and second couplings from said passage;

e) said first coupling having a second cylindrical bore formed in a second end thereof;

f) said second coupling including an enlarged second end having a spherical outer surface;

g) said spherical outer surface engaging said second cylindrical bore so as to allow said second coupling to pivot about a geometric center of said enlarged second end of said second coupling and so as to allow said second coupling to slide axially relative to said first coupling, wherein said spherical outer surface and said second cylindrical bore combine with said bellows means to accommodate angular misalignment between said first and second fluid-carrying pipes and to accommodate axial movement of said first and second fluid carrying pipes relative to one another, said spherical outer surface and said second cylindrical bore also combining with one another to form a secondary sealing means of said expansion joint;

h) a radially outwardly extending annular flange attached to said second coupling;

i) an annular shield disposed coaxially with and fixedly attached to said first coupling, said shield being disposed radially outward of said annular bellows;

j) wherein said radially outwardly extending flange is radially inward of and radially spaced from said shield so as to limit the pivoting of said second coupling about said geometric center of said enlarged second end;

k) said second coupling includes an annular shoulder portion disposed proximate said enlarged second end of said second coupling;

l) said shoulder portion is disposed relative to said second end of said first coupling so as to limit axial compression of said bellows;

m) said annular shield includes a distal end comprising a radially inwardly extending flange;

n) said radially inwardly extending flange of said shield is disposed relative to said radially outwardly extending flange attached to said second coupling, so as to limit axial extension of said bellows.

* * * * *